United States Patent

[11] 3,593,141

[72] Inventors Earl F. Brown Piscataway; William Kaminski, West Portal; John O. Limb, New Shrewsbury; Frank W. Mounts, Colts Neck, all of, N.J.

[21] Appl. No. 861,322
[22] Filed Sept. 26, 1969
[45] Patented July 13, 1971
[73] Assignee Bell Telephone Laboratories Incorporated Murray Hill, N.J.

[54] SIGN PREDICTION CODING FOR PULSE CODE COMMUNICATION SYSTEMS
4 Claims, 6 Drawing Figs.

[52] U.S. Cl. ........ 325/38, 332/11
[51] Int. Cl. ........ H04b 1/00
[50] Field of Search ........ 325/38, 38 B, 42; 179/15 AP, 15 AC, 15 AE, 15.55; 340/347 DD, 347 AD; 332/9, 11; 178/68

[56] References Cited
UNITED STATES PATENTS
3,151,296 9/1964 Phyfe ........ 170/15.55

*Primary Examiner*—Robert L. Griffin
*Assistant Examiner*—Anthony H. Handal
*Attorneys*—R. J. Guenther and E. W. Adams, Jr.

ABSTRACT: A differential pulse code communication system is disclosed with sign prediction coding which reduces the number of digits required to describe the levels produced in the quantization of the differential signal. In the system the sign of the largest positive and negative levels of the quantizer are predicted by assuming that they have the same sign as the previous level. If the prediction is wrong a lower level with the correct sign is transmitted rather than the level with the predicted sign. Because of the prediction, additional levels may be added in the quantizer in the space otherwise reserved for the signs predicted without increasing the pulse rate of the system.

INVENTORS E. F. BROWN
W. KAMINSKI
J. O. LIMB
F. W. MOUNTS

BY Leonard U. Arnold
ATTORNEY

SIGN PREDICTION CODING FOR PULSE CODE COMMUNICATION SYSTEMS

BACKGROUND OF THE INVENTION

In differential pulse code communication systems, such as that disclosed in U.S. Pat. No. 2,605,361, issued July 29, 1962, the difference between the actual value of a signal and an estimate of the signal based on its past is transmitted. The advantage gained by this technique is the removal of redundancy in the information signal before transmission. Any portion of a signal which can be predicted is considered redundant in that it does not contain information and need not be transmitted to reconstruct the signal at a distant receiver.

In the encoding process of the system referred to above, the difference signal is sampled and quantized into a number of positive and negative quantum levels. Generally, since the difference signal has an equal probability of varying in the positive or the negative direction, a symmetrical quantizing circuit is used so that the number of positive levels is equal to the number of negative levels. In the system above, the quantized difference signal is integrated in a feedback path and subtracted from the input signal in order to complete a feedback loop. Because of the feedback loop the transmitted difference signal effectively represents only the changes rather than the total of the input signal.

To transmit the difference signal in prior art differential coding systems each quantum level is assigned a predetermined binary code. In binary notation the presence of a pulse is indicated by a binary "1" and the absence of a pulse is indicated by a binary "0." The presence or absence of a pulse in a given time interval represents one bit of information. Assume, for example, that the sampled difference signal is divided into eight quantum levels, four for the positive portion of the signal and four for the negative portion of the signal. These eight levels may be represented in a three-bit binary form in the following manner:

| Level: | Code |
|---|---|
| +4 | 111 |
| +3 | 110 |
| +2 | 101 |
| +1 | 100 |
| −1 | 000 |
| −2 | 001 |
| −3 | 010 |
| −4 | 011 |

Each three-bit code group is transmitted when the sampled difference signal triggers its corresponding quantum level. The resulting transmitted signal thus appears as a continuous sequence of code groups which may be decoded at the receiver to reproduce the quantized samples. It is a characteristic of such binary codes that the number of combinations or levels that may be described with a given code is equal to two raised to a power equal to the number of bits in each code group. Thus with three bits in each code group the number of possible levels that may be described is two to the third power, or eight, and with four bits the number of possibilities is two to the fourth power, or 16.

In many applications it is often desirable to utilize a three-bit code in describing a given input signal. With normal sampling rates the three-bit code group permits reasonable bit rates which are within the channel capacity desired for the system. Often, however, it is desirable to increase the number of quantum levels used to describe the difference signal in the system. Increasing the number of quantum levels generally decreases the size of the spacing between the levels and thereby decreases the error inherent in the quantization of a continuous signal. With conventional binary codes, as described above, any increase of the quantum levels above eight requires the addition of a bit in each code group so that the effective number of possibilities increases to 16. Such an increase in the number of bits per code group also increases the required bit rate of the system by 33 percent since the added bit is repeated in each code group. In addition, because of the nature of binary coding it may be appreciated that if a four-bit code group is used the number of levels should not be less than 16 in order to fully utilize the capacity of the system. It is desirable to be able to increase the number of quantum levels in these systems without increasing the number of bits that must be used to describe the signal. It is also desirable to permit more flexibility in the coding system so that an odd number of quantum levels, such as nine, may be used to include a zero level in the scale of a symmetrical quantizing circuit without creating unused capacity in the system.

It is, therefore, the object of the present invention to provide a coding system for differential signals that permits added quantum levels without the need for increasing the bit rate or channel capacity of the system.

It is a further object of the invention to provide a coding system which anticipates the polarity of the signal in differential systems so that a predetermined number of levels may be described without regard to their polarity.

SUMMARY OF THE INVENTION

It may be appreciated from the above discussion that in the symmetrical quantization of a differential signal each quantum level may be defined in terms of a magnitude and a sign. In the eight-level example above the system may be described with four magnitudes, and each of the magnitudes has an associated sign of plus or minus to yield the eight levels or the eight possible combinations for the transmitted signal.

In accordance with the above objects a sign prediction coding system for differential signals is disclosed which omits the sign information for the outside levels of the quantizer and assumes that whenever these levels are activated they have the same sign as the previously transmitted level. The system is based on the premise that this prediction of the sign for the outer levels is reasonably accurate for a multilevel system since the probability is small of having an outside level preceded by a level of opposite sign. If the prediction is wrong, a lower level with the correct sign is transmitted rather than the outside level. Incorrect prediction, of course, increases the effective quantization error at those instances in the signal because the actual value of the signal will be in excess of the value transmitted. Because of the nature of the signal, however, the incorrect predictions will be rare.

In accordance with the present invention, the deletion of the sign information on the outer levels permits the insertion of an extra quantum level at "0" without increasing the bit rate of the system. Stated differently, this means that the deletion of the sign in the outer levels and the insertion of the "0" level still leaves the quantized signal with eight defined combinations which may be described with a three-bit code. This result is effected in the example above by assigning both the +4 and the −4 levels the same code designation in the transmitted signal. The receiver detects this code and reconstructs either the +4 or the −4 level depending on the sign of the previously transmitted level. The code word not transmitted for the magnitude four level is then used to denote the "0" level. As may be appreciated the "0" level reduces the quantization error for small signals by reducing the step size between the smallest quantum levels. The outer levels remain relatively unaffected since their sign may be predicted reasonably accurately from previously transmitted code words.

The sign prediction coding system described above may also be extended to systems where multiple outer levels are inserted in the quantizer circuit without regard to sign. Thus, for example, a 10 -level system may be reduced to eight defined possibilities and thereby transmitted with a three-bit code by deleting the sign characterization on the numbers 4 and 5 levels. The three inner levels, numbers 1, 2 and 3, each contain a sign designation, thereby totaling six possibilities and requiring six code groups for transmission. The numbers 4 and 5 levels, without sign designations, require only two code groups for transmission. The system as a whole with 10 levels is thereby reduced to eight transmitted combinations which may be described with a three-bit code in the same manner as shown above. The receiver determines the sign of the number 4 and 5 levels by detecting the sign of the previously transmitted level. If the magnitude four or five level is preceded by an incorrect sign, the next lower level, or three level, with the correct sign is transmitted. In this manner the receiver always determines the correct sign of the encoded difference signal.

As will be appreciated from the detailed description below the sign prediction coding system used in accordance with the present invention may be simply implemented to provide efficient and economical use with conventional differential pulse code communications systems. Economical implementation increases the commercial value of the system and enhances its possibilities for future use in nationwide communication networks.

DETAILED DESCRIPTION

Figure 1:
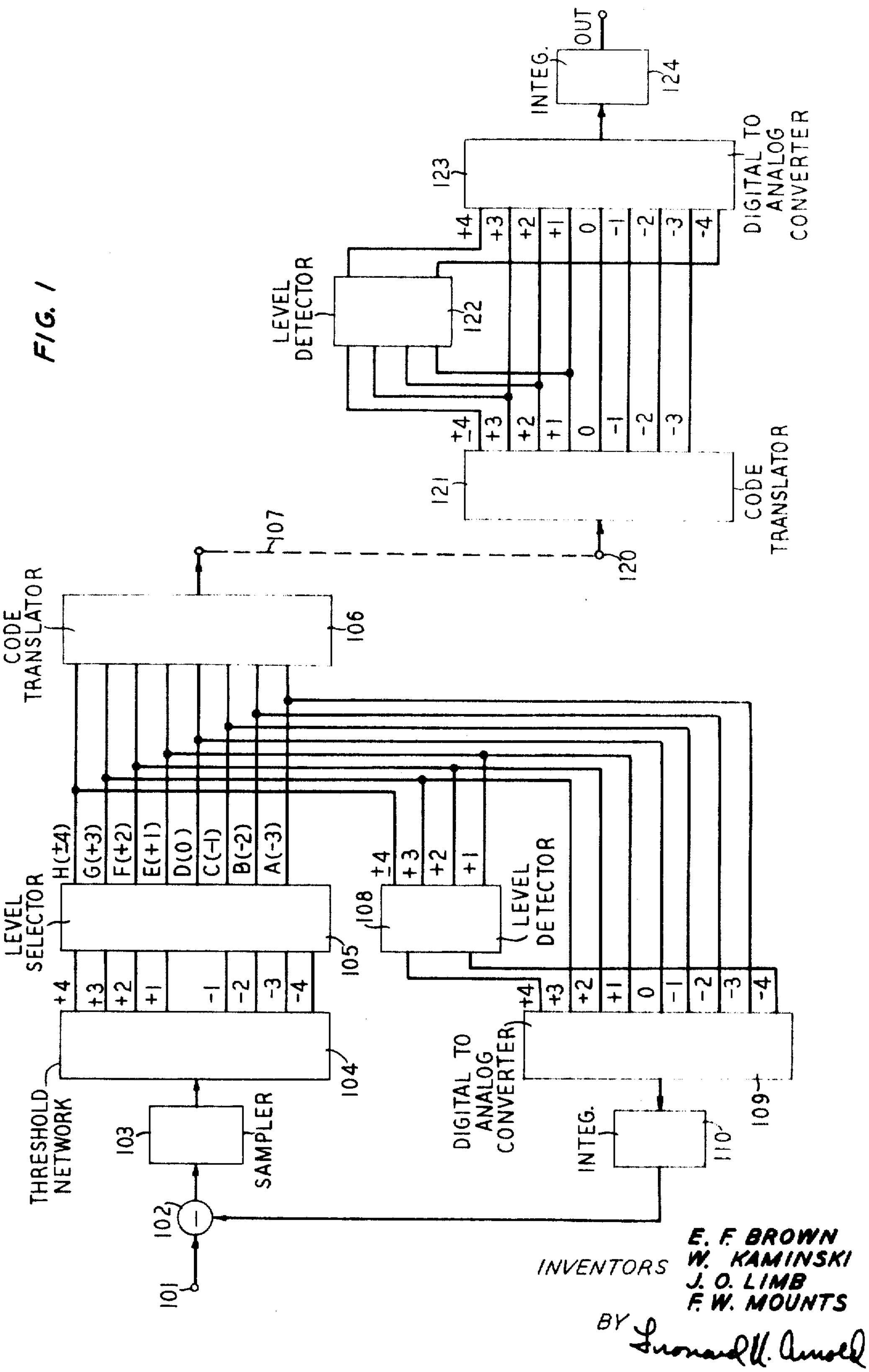
FIG. 1 is a block diagram of a differential pulse code communication system using the sign prediction coding of the present invention.

A differential pulse code communication system using the sign prediction coding of the present invention is shown in FIG. 1. An analog message wave supplied from a conventional signal source at input 101 is passed to subtractor circuit 102. A generated feedback signal is subtracted from the input message wave in subtractor circuit 102 to produce a difference signal. In effect, the difference signal represents the changes rather than the total of the input wave. Generally, since the difference signal represents changes, it has an equal probability of varying in either the positive or the negative direction. Sampler circuit 103 samples the difference signal at the output of circuit 102 at predetermined intervals. The amplitude samples at the output of sampler circuit 103 are processed in threshold network 104, level selector 105 and code translator 106 and the resultant signal is passed to a distant receiver via transmission path 107.

Threshold network 104 contains a set of threshold circuits which separate the amplitude samples into nine quantum levels. Four of the levels are reserved for positive portions of the signal, four of the levels are for negative portions of the signal and one level is used to indicate a "0" or null in the signal. The quantum levels in network 104 are symmetrical in that the amplitude of each positive level is equal to a corresponding negative level. Each quantum level of network 104 is indicated by a distinct pulse code which appears on eight output leads. The eight output leads of threshold network 104 are labeled with numbers 1, 2, 3 and 4 and have éither positive or negative sign to indicate the four positive and the four negative threshold levels for the output signal. The "0" level is indicated by the absence of a pulse on any of the output leads. The remaining quantum levels are indicated at the output of threshold network 104 by setting each threshold circuit in the network at consecutively higher values so that each sample triggers a different number of threshold circuits, depending upon its quantized amplitude. If, for example, a sample has a quantized amplitude corresponding to the +3 level, three of the threshold circuits respond to the sample and produce pulses on the leads labeled +1, +2 and +3. In this manner the largest quantum level, i.e., the +4 or −4 level, is indicated by activating all of the positively or all of the negatively labeled leads. If the quantized amplitude of the sample from circuit 103 is "0," then none of the threshold circuits in network 108 is activated and no pulses are transmitted to the output leads.

As indicated above, threshold network 104 separates the difference samples from sampler circuit 103 into nine quantum levels. By conventional means the maximum number of levels that may be transmitted is eight. In accordance with the present invention, however, level selector 105 precodes the signal from threshold network 104 by means of a sign prediction technique and thereby reduces the nine levels to a form that may be transmitted with a three-bit code. Briefly, level selector 105, performs this function by effectively deleting the sign designation on the +4 and −4 levels of threshold network 104. Level selector 105 receives the pulse code from threshold network 104 and transforms that code to a code that appears as a pulse on one of its eight output leads labeled A, B, C, D, E, F, G and H. Since the pulse designation on one, and only one, of the eight output leads reduces to an eight combination code, it may be represented with a conventional three-bit format.

Figure 2:
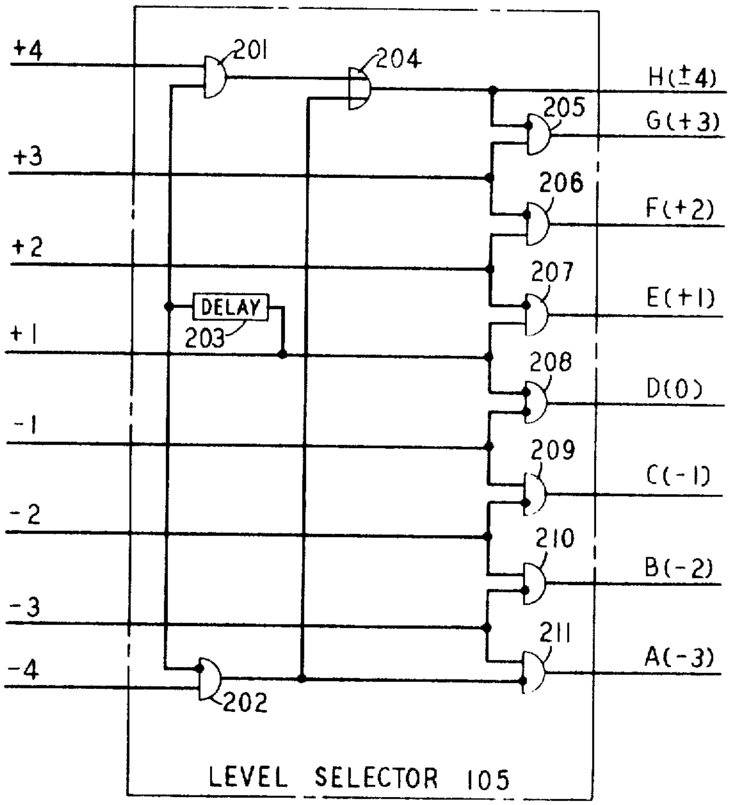
FIG. 2 is a detailed block diagram of level selector circuit 105 shown in FIG. 1.

Level selector 105 shown in detail in FIG. 2 reduces the nine quantum levels of network 104 to eight distinct code combinations by restricting the transmission of outer levels +4 and −4 to those instances where the outer level is preceded by a level of the same sign. This restriction is based on a prediction that the difference signal will not vary from a negative value to an extreme positive value and vice versa. The prediction is reasonably accurate because the probability that two successive samples of the difference signal will vary from a negative value to the extreme positive value or from a positive value to the extreme negative value is relatively remote. This being so, both outer levels may be reduced to a single magnitude and transmitted only when the previously transmitted code has the correct sign without undue distortion in the signal. If the prediction is wrong so that outer level +4 or −4 is preceded by a level of opposite sign, the extreme level is not transmitted but the next closest level with the correct sign is transmitted. Thus, if a sample with a magnitude corresponding to the +4 level is directly preceded by a sample corresponding to a negative level, the code for the +3 level is transmitted rather than for the magnitude 4 level.

The above-described prediction function is performed by level selector 105, shown in FIG. 2, by connecting the +4 output lead from network 104 to AND gate 201 and by connecting the −4 output lead to INHIBIT gate 202. In order to indicate the sign of the previous sample the +1 output lead from circuit 104 is connected through delay circuit 203 to both AND gate 201 and INHIBIT gate 202. If the previous sample is positive, i.e., has an amplitude corresponding to the +1, +2, +3 or +4 levels, a pulse will appear on the output lead labeled +1. Delay circuit 203 has a delay equal to one sampling interval. As a result, the pulse appearing at the +1 lead will be delayed one sampling interval and appear at AND gate 201 and INHIBIT gate 202 in the next sampling interval when the next set of code pulses appears from network 104. If the previous sample was positive, the pulse on the +1 lead appears through delay circuit 203 in the next sampling interval to enable AND gate 201 and disable INHIBIT gate 202. Thus, if the outer level +4 is preceded by a positive level, AND gate 201 is enabled and a pulse is passed through OR gate 204 to the H output lead of level selector 105. Similarly, if the outer level −4 is preceded by a negative level, AND gate 201 is disabled and INHIBIT gate 202 is enabled so that the pulse appears through OR gate 204 and passes to the H output lead of level selector 105.

If either the +4 or the −4 level is activated in an interval that is preceded by a level of opposite sign, the pulse on the +4 or the −4 level is inhibited in AND gate 201 or INHIBIT gate 202, respectively, and is not passed to the output of level selector 105. It may be noted in level selector 105, as shown in FIG. 2, that the "0" level is arbitrarily treated the same as a negative level in the prediction process so that only the −4 level may be transmitted after the "0" level. In the case of an incorrect prediction wherein the +4 or −4 level is preceded by a level of opposite sign, the next lower level, either the −3 or the +3 is automatically transmitted through level selector 105 by passing the remainder of the pulse code from network 104. Logic gates 205, 206, 207, 208, 209, 210 and 211 in level selector 105 transform the pulse code from threshold network 104 and OR gate 204 to a code format which appears as a distinct pulse on only one of the output leads A, B, C, D, E, F, G and H rather than a set of pulses on successive leads as at the output of threshold network 104. Assume, for example, that a sample from circuit 103 ' a quantized amplitude of +3. Then the +1, +2 and +3 leads at the output of network 104 are activated. These pulses on the +1, +2 and +3 leads are processed in gates 205, 206, 207 and 208 so that a pulse appears at the output labeled G and no pulses appear at the remainder of the output leads. The pulses on the +1 and +2 leads are inhibited in gates 206, 207 and 208 because of the logic circuitry shown, which is well known in the state of the art. In the absence of a pulse input on either the +1 or the −1 leads from network 104, gate 208 produces a pulse on the D output to indicate a "0" level. For clarity each output lead of level selector 104 contains a designation in parenthesis indicating which quantum level is required to produce a pulse on that lead.

Code translator 106 receives the code from level selector 105 on its eight input leads and transforms that code to a three-bit format. Code translator 106 may be any of a number of circuits well known in the art. The code applied at its input appears at each sampling interval as a single pulse on one of eight possible input leads. Since only one lead is activated at each sampling interval, the input code has eight possible variations. Code translator 106 simply transforms this type of code, i.e., the one of eight combination, to a three-bit code wherein the eight combinations are indicated by the eight possibilities that may be generated with "0's" and "1's" in a three-bit sequence. Each three-bit code group is transmitted in succession to the receiver portion of the systems via transmission path 107.

Figure 3:
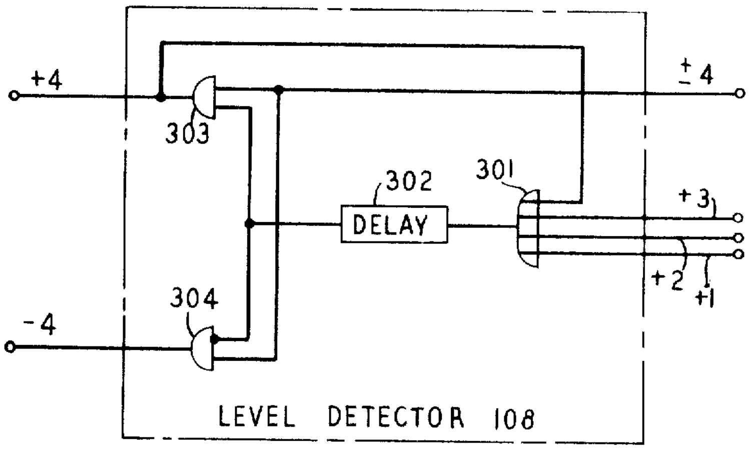
FIG. 3 is a detailed block diagram of level detector circuit 108 shown in FIG. 1.

The feedback path of the transmitter portion of the system shown in FIG. 1 is composed of level detector 108, digital-to-analog converter 109 and integrator 110. In this feedback path the difference signal is decoded by means of level detector 108 and digital-to-analog converter 109 and passed through integrator 110 to form the estimate of the input signal that is fed back to subtractor circuit 102. The function of level detector 108, shown in schematic diagram form in FIG. 3, is to separate the ±4 code from OR gate 204 in level selector 105 into the ±4 and −4 levels of the quantized difference signal. If the ±4 code is preceded by a negative or a zero level it is converted to a −4 code, and if the ±4 code is preceded by a positive level it is converted to a +4 code. In order to accomplish this result the +1, +2 and +3 leads are fed through OR gate 301 and passed via delay circuit 302 to AND gate 303 and INHIBIT gate 304. Delay circuit 302 has a one sampling interval delay so that if a pulse appears on either the +1, +2 or +3 input leads it appears one sampling interval later at AND gate 303 and INHIBIT gate 304. The ±4 input is applied directly to AND gate 303 and inhibit gate 304 so that if the previous level from level selector 105 is negative, no pulse appears at the output of delay circuit 302 and INHIBIT gate 304 is enabled to pass a pulse to the output of detector 108 on the lead labeled −4. Similarly, if the ±4 lead is activated in a sampling interval which is preceded by a positive level, i.e., a pulse on the +1, +2 or +3 leads, a pulse appears at the output of delay circuit 302, enabling AND gate 303, disabling INHIBIT gate 304 and thereby causing a pulse to appear at the +4 output of level detector 108. The +4 output is fed back to OR gate 301 so that the proper sign information for the previous levels is retained when successive ±4 codes are detected. In this manner the second ±4 code is correctly given the same sign as the previous ±4 code. The +4 and −4 output leads of detector 108, together with the +3 through −3 leads from selector 105, are connected to the input of digital-to-analog converter 109.

The pulse indications on the nine input leads to digital-to-analog converter 109 are converted in a conventional manner to an analog signal which is integrated in integrator circuit 110. The integrated signal is fed back for subtraction from the input signal in subtractor circuit 102.

In the receiver portion of the system shown in FIG. 1 the transmitted code from translator 106 appears at input 120 and is applied to code translator 121. Code translator 121 is a conventional circuit well known in the art which performs an operation the inverse of the translating operation performed by circuit 106 in the transmitter. Each arriving three-bit code is converted to a code which appears as a pulse on one of eight output leads. For clarity the eight leads at the output of code translator 121 are labeled −3, −2, −1, 0, +1, +2, +3 and ±4, as shown, in order to correspond to the designations used at the input of circuit 106 in the transmitter. Each of these output leads is activated in response to a selected one of the eight transmitted codes from circuit 106. As in the transmitter portion of the system, a pulse on the lead labeled ±4 must be converted in accordance with the sign prediction system to either a +4 or a −4 code. Level detector 122 performs this function in the identical manner as level detector 108 shown in the transmitter. If the ±4 code is preceded by a positive level it is converted to a +4 code and if it is preceded by a zero or a negative level it is converted to a −4 code. The resultant nine combinations are converted in a conventional manner to analog form in analog converter 123 and integrated in integrator 124 to produce the output signal which may be passed to any conventional utilization device.

In reviewing the embodiment of the invention shown in FIG. 1 it should be kept in mind that the essential features are that level selector 105 reduces the nine quantum levels of threshold network 104 to a format that may be encoded with a standard three-bit code. The operation of level selector 105 is based on the premise that the sign of the outer levels from threshold network 104 may be predicted fairly accurately by monitoring the sign of the previously generated level.

Figure 4:
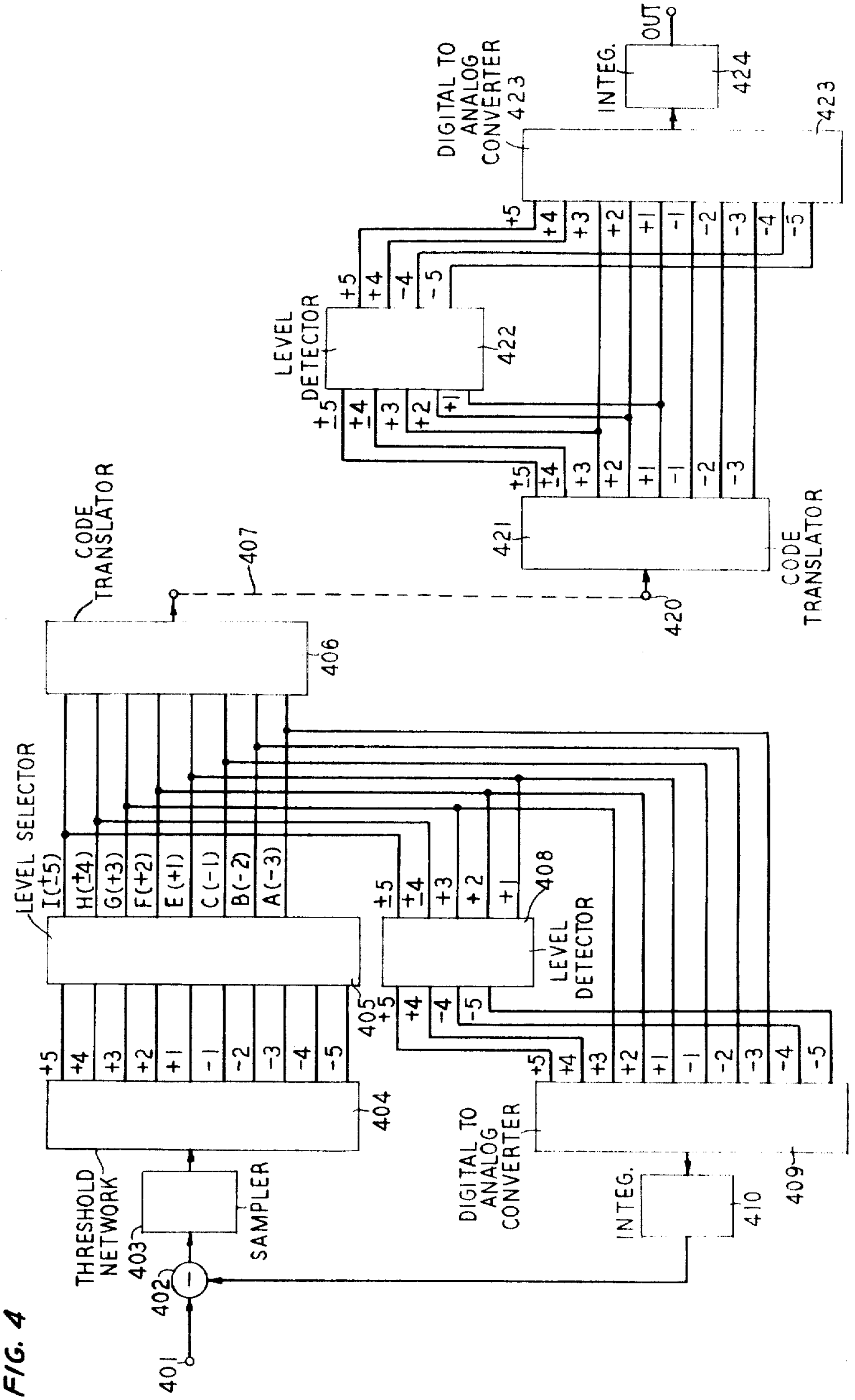
FIG. 4 is a block diagram of a differential pulse code communication system using an alternative embodiment of the sign prediction coding of the present invention.

Using this basic principle, the system shown in FIG. 1 may be extended to a system using a threshold network which initially divides a signal into 10 quantum levels. One such system with a 10-level threshold network is shown in FIG. 4. In the same manner as in FIG. 1, an analog message wave is applied at input 401 and passed to subtractor circuit 402. A feedback signal is subtracted from the analog signal in subtractor 402 and the resultant difference signal is sampled in sampler circuit 403. Threshold network 404, shown in FIG. 4, corresponds in function to threshold network 104, shown in FIG. 1, but instead of dividing the difference signal into nine levels, it divides the signal into 10 levels by dividing it into five positive and five negative levels and eliminating the "0" level. In accordance with the embodiment of the invention shown in FIG. 4, these 10 levels are reduced to eight three-bit code combinations by transmitting the magnitude 4 and magnitude 5 levels without a sign designation. In order to accomplish this, both the magnitude 4 and the magnitude 5 levels are only transmitted if the preceding level contains the same sign. Thus, as with the system in FIG. 1, if the previous sign or the predicted sign is wrong, neither the 4 nor the 5 level is transmitted but rather the next best thing, a 3 level, is transmitted with a code designation which specifies the correct sign.

Figure 5:
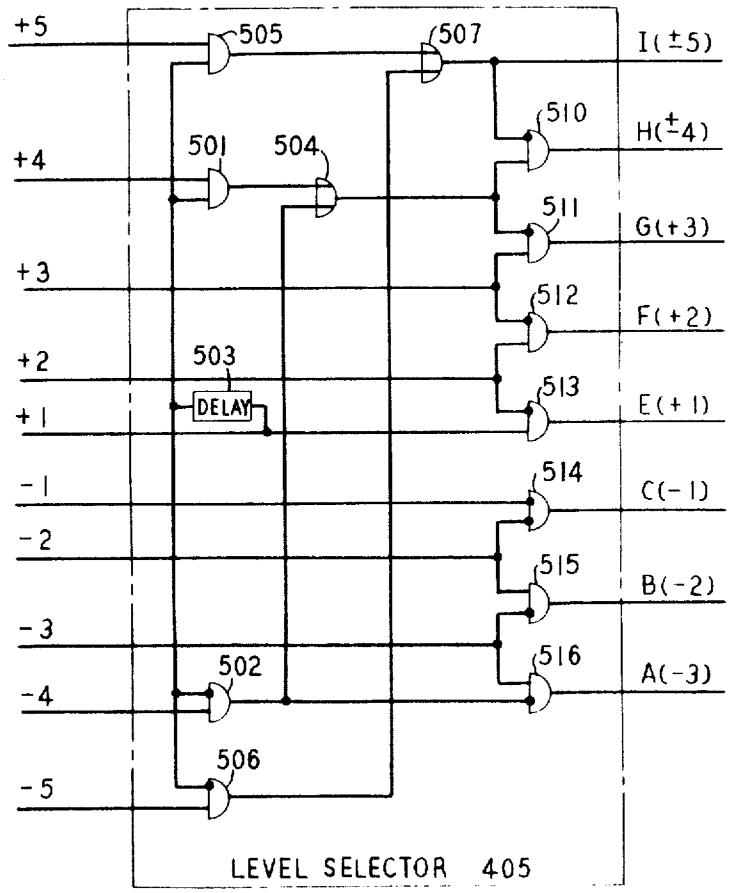
FIG. 5 is a detailed block diagram of level selector circuit 405 shown in FIG. 4.

Level selector 405 shown in detail in FIG. 5 performs this operation by inhibiting the magnitude 4 and 5 levels whenever their sign is different from a preceding level. The +4 and −4 levels are assigned one code and the +5 and −5 levels are assigned another code. The remaining six levels retain individual codes for a total of eight possible combinations. This function is performed by level selector 405 in a manner similar to that shown for level selector 105 in a manner similar to that shown for level selector 105 in FIG. 1. AND gate 501, INHIBIT gate 502 and delay element 503 shown in FIG. 5 perform identical functions to elements 201, 202 and 203 in FIG. 2, so that the +4 and −4 levels are combined and passed through OR gate 504 to the output labeled H in a similar manner as the circuit shown in FIG. 2. Similarly, the −5 level is combined with the +5 level by means of AND gate 505 and INHIBIT gate 506, both of these gates being connected to delay element 503 in the same manner as gates 501 and 502. The ±5 code is then indicated on the output labeled I through OR gate 507. In order to shown the similarity between the level selector 405 in FIG. 5 and level selector 105 in FIG. 2, the output leads have been labeled A, B, C, E, F, G, H and I. The D output is omitted to indicate that the "0" level is not utilized in the system shown in FIGS. 4 and 5 and the I level is included to show that the additional ±5 level has been added instead of the 37 0" level. The +1 and −1 inputs of level selector 405 are controlled by a single threshold in threshold network 404, the +1 input being activated by a positive sample and the −1 input being activated by a negative sample. Of course, it is apparent that the circuit shown in FIG. 5 still contains eight output leads, each being activated by a selected pulse to indicate a specific code. Logic gates 510, 511, 512, 513, 514, 515 and 516 transform the code from threshold network 404 and OR gates 504 and 507 to the format wherein only a single output lead of level selector 405 is activated to indicate a given code. This follows the same scheme used in FIGS. 1 and 2 above.

In the same manner as for the system shown in FIG. 1, the code produced by level selector 405 in FIG. 4 is translated to a three-bit format in code translator 406 and transmitted to the receiver portion of the system via transmission path 407. In the feedback path of the system shown in FIG. 4, level detector 408, digital-to-analog converter 409 and integrator 410 process the code from level selector 405 to convert the difference signal to analog form and provide an estimate of the input signal at subtractor circuit 402. Level detector 408 operates on the same principle as level detector 108 in FIG. 1.

Figure 6:
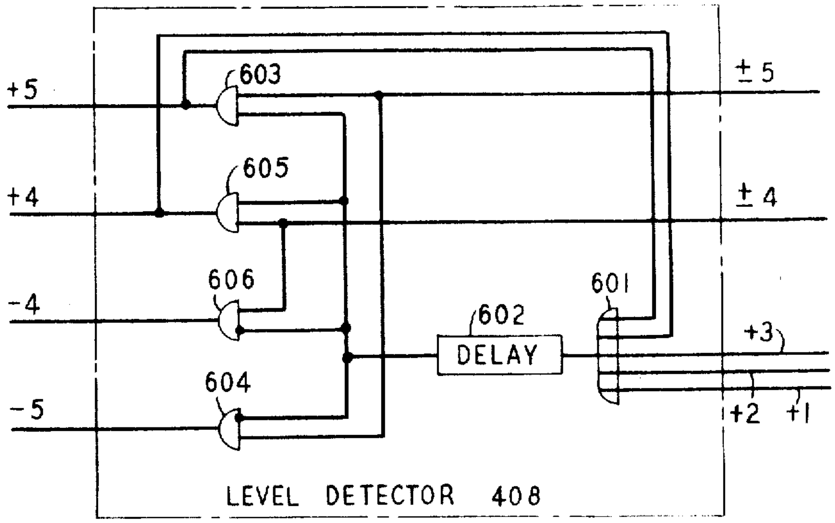
FIG. 6 is a detailed block diagram of level detector circuit 408 shown in FIG. 4.

Level detector 408, shown in detail in FIG. 6, has five inputs labeled +1, +2, +3, ±4 and ±5 and four outputs labeled +5, +4, −4 and −5. Its function is to determine the sign of each of the ±4 and ±5 codes. This is accomplished by passing the +1, +2, and +3 inputs through OR gate 601 and delay element 602, with a one sampling interval delay, to logic gates 603, 604, 605 and 606. If either the +1, +2 or +3 inputs is activated, AND gates 603 and 605, shown in FIG. 6, are enabled in the next sampling interval. Thus, if the succeeding code enables either the ±5 or the ±4 leads, respectively, either the +5 or the +4 output is activated. Similarly, the −4 and the −5 outputs are activated through INHIBIT gate 606 or 604 when the ±4 or the ±5 inputs are activated subsequent to a negative code from level selector 404. Both the +5 and the +4 outputs from AND gates 603 and 605 are fed back to OR gate 601 to provide for the case when the preceding code is a level 4 or level 5. As a result the correct sign is retained for successive codes of the higher levels in the same manner as for preceding codes of lower levels. Digital-to-analog converter 409, well known in the art, converts the code appearing on its 10 input leads from level selector 405 and level detector 408 to an analog signal which is then integrated in integrator 410 to produce the estimate of the input signal.

The receiver portion of the system shown in FIG. 4 contains code translator 421, level detector 422, digital-to-analog converter 423 and integrator 424, which correspond in function to corresponding elements numbered 300 numerals lower in FIG. 1. Briefly, code translator 421 performs the function the inverse of translator 406 in the transmitter and activates one of its eight output leads labeled as shown. Level detector 422, identical to level detector 408, determines the correct sign for the ±4 and ±5 codes by monitoring the preceding codes. Digital-to-analog converter 423 converts the resultant code from code translator 421 and level detector 422 to analog form. The signal at the output of integrator 424 is the reconstructed version of the original input signal supplied at input 401.

While the present invention is shown embodied in a differential pulse code communication system in FIGS. 1 and 4, it should be noted that predictive coding systems of this type are not limited to differential systems. So long as the signal to be coded varies above and below a median value and so long as it is reasonably predictable that the signal will not vary very often from one side of the median to the other side of the median, then the predictive coding of the present invention may be utilized to reduce the number of codes required to faithfully represent a set of quantum levels. Thus, it should be understood that the above embodiments are merely illustrative of the principles of the invention and that many modifications may be effected by those skilled in the art without departing from the spirit and scope of the invention.

We claim:

1. A system for encoding an information-bearing signal of the type having means for sampling and quantizing the information signal into a predetermined number of quantum levels, a plurality of the levels being above a predetermined median and a plurality of the levels being below said predetermined median, and means for generating code representations of the quantized samples, characterized in that said means for generating said code representations comprises:
   - means for selecting the samples corresponding to the largest quantum level above said median and the largest quantum level below said median;
   - means for assigning a single code representation to the samples corresponding to both of said largest levels, said single representation being transmitted only when the sample of said largest level is preceded by a sample on the same side of said median; and
   - means for assigning a code representative of a sample at a lower level when the level of said largest quantized sample is preceded by a sample which varies on the opposite side of said median.

2. In a coding system for transforming an information-bearing signal into a digital code by assigning code representations to quantized amplitude samples varying above and below a predetermined median of the signal, apparatus for reducing the number of digits required to represent the quantized samples comprising:
   - means for representing each level of the quantized samples below a predetermined variation from said median as a unique code,
   - means for representing each level of said quantized samples above a predetermined variation from said median as a code indicative of both a first predetermined level above said median and a second predetermined level below said median,
   - means for transmitting said code representation of said and second predetermined levels to the output of said system only when the sample corresponding to one of said predetermined levels is preceded by a sample which varies on the same side of said median, and
   - means for transmitting a code representation of another and lower level to the output of said system when said sample corresponding to one of said first and second predetermined levels is preceded by a sample varying on the opposite side of said median.

3. A system for transmitting quantized amplitude samples varying above and below a predetermined median comprising in combination:
   - means at a transmitter for representing each level of the quantized samples less than a predetermined variation from said median as a unique code,
   - means at the transmitter for representing each level of the quantized samples greater than a predetermined variation from said median as a code indicative of both a first predetermined level above said median and a second predetermined level below said median, means at the transmitter for applying said code representation, of said first and second predetermined levels to a transmission median only when the sample corresponding to one of said predetermined levels is preceded by a sample which is on the same side of said median, means for applying a code representation of another and lower level to a transmission median when said sample corresponding to one of said first and second predetermined levels is preceded by a sample varying on the opposite side of said median, means at a receiver for detecting the single code indicative of both said first and second predetermined levels, means at the receiver for determining whether the code transmitted immediately preceding said single code is representative of a sample above or below said median, and, means at the receiver for transforming said single code to said first predetermined level if the level determined by said preceding code is above said median and for transforming said single code to said second predetermined level if the level determined by the preceding code is below said median.

4. Apparatus in a differential pulse code communication system comprising:

a source of an information-bearing signal, means for producing a difference signal by subtracting a generated feedback signal from said information-bearing signal, means for quantizing said difference signal to a predetermined number of quantum levels, a plurality of said quantum levels being assigned to positive portions of said difference signal and a plurality of said levels being assigned to said negative portion of said signal, means for assigning a single code representation to those samples corresponding to both a first predetermined positive level and a second predetermined negative level when said samples are preceded by a sample having the same polarity, means for assigning a unique code representation indicative of a lower level when said sample corresponding to said first and second predetermined levels is preceded by a sample of opposite polarity, and means for generating said feedback signal, including a means for detecting the single code indicative of said predetermined positive and negative levels and means responsive to the codes preceding said single code for transforming said single code to said positive level if said preceding code is positive and to said negative level if said preceding code is negative.